(12) United States Patent
Hughes et al.

(10) Patent No.: US 7,167,986 B2
(45) Date of Patent: Jan. 23, 2007

(54) UPGRADEABLE TIMESTAMP MECHANISM

(75) Inventors: James P. Hughes, Lino Lakes, MN (US); Axelle Apvrille, Toulouse (FR)

(73) Assignee: Storage Technology Corporation, Louisville, CO (US)

( * ) Notice: Subject to any disclaimer, the term of this patent is extended or adjusted under 35 U.S.C. 154(b) by 859 days.

(21) Appl. No.: 10/027,341

(22) Filed: Dec. 26, 2001

(65) Prior Publication Data

US 2003/0120939 A1    Jun. 26, 2003

(51) Int. Cl.
*H04L 9/00* (2006.01)
(52) U.S. Cl. .................. 713/178; 713/176; 713/180
(58) Field of Classification Search ............. 713/178, 713/176, 180, 200, 201
See application file for complete search history.

(56) References Cited

U.S. PATENT DOCUMENTS 5,297,279 A * 3/1994 Bannon et al. ......... 707/103 R
5,437,027 A * 7/1995 Bannon et al. ......... 707/103 R
5,982,769 A * 11/1999 Bond et al. .................. 370/357
6,205,473 B1 * 3/2001 Thomasson et al. ........ 709/217
6,212,557 B1 * 4/2001 Oran .......................... 709/221

* cited by examiner

*Primary Examiner*—Thomas R. Peeso
(74) *Attorney, Agent, or Firm*—Brooks Kushman P.C.

(57) ABSTRACT

A method, computer program product, and data processing system for generating and validating an upgradeable digital timestamp of a document is disclosed. The digital timestamp includes a hash value, a current time, and a digital signature. Over time, as computer and cryptanalytic technology progresses, upgrade timestamps are applied to the document that take advantage of more advanced, more difficult to break hash functions or digital signature schemes. These upgrade timestamps are applied preventatively at a point in time just prior to the timestamp's being able to be compromised.

48 Claims, 4 Drawing Sheets

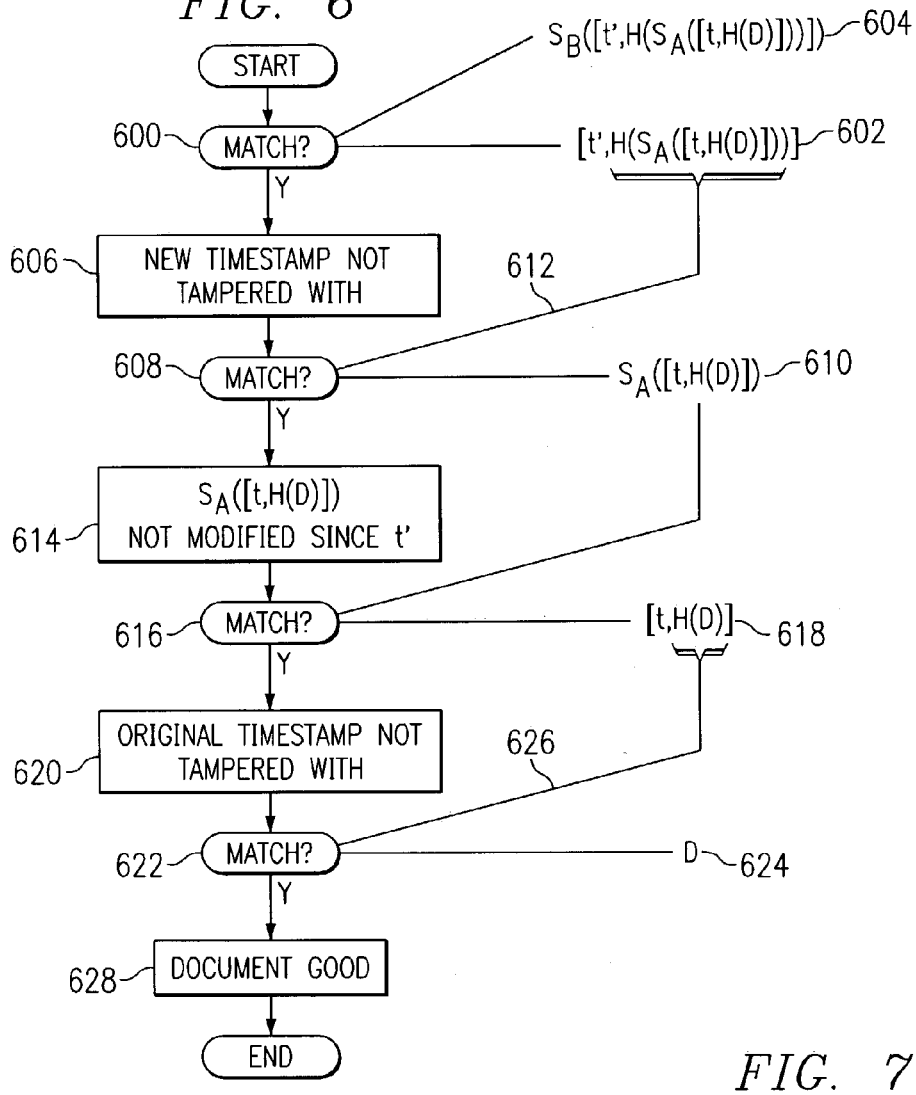
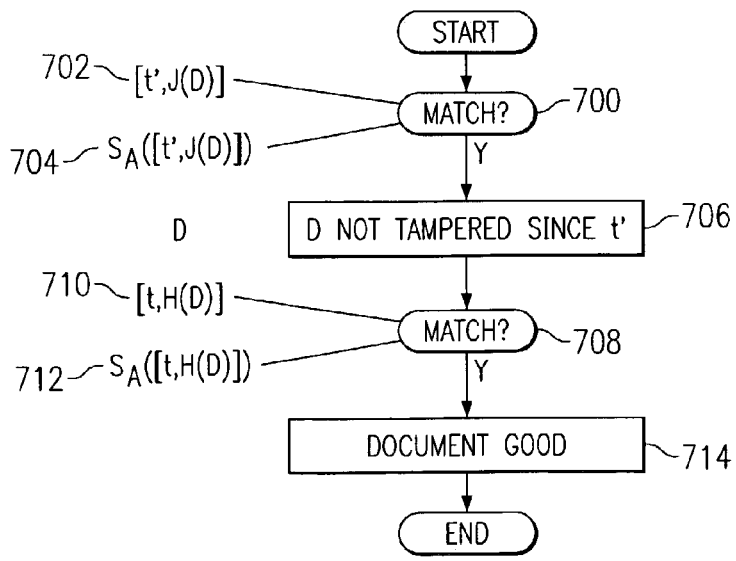

UPGRADEABLE TIMESTAMP MECHANISM

FIELD OF THE INVENTION

The present invention relates generally to digital timestamps. Specifically, the present invention is directed toward a digital timestamp that may be updated to preserve its integrity as cryptographic technologies become obsolete.

BACKGROUND OF THE INVENTION

Digital time stamps, like their paper counterparts, are used to certify that a specific document has not been modified since a specific date. A digital time stamp includes a hash value calculated from the document to be time stamped, the current time at the time of the timestamp, and a digital signature signing both the hash value and the current time.

The digital signature and hash value are what make a timestamp secure (i.e., they ensure the authenticity of the timestamp). Digital signatures generally rely on public key cryptosystems such as the Rivest-Shamir-Adleman (RSA) public-key cryptosystem. Hash values are calculated using hash functions such as SHA-1 (Secure Hashing Algorithm 1) and MD5 (Message Digest 5), which map entire documents into fixed-bitlength numbers. If the integrity of either the hash function used to produce the hash value or the cryptosystem used to produce the digital signature is compromised, the timestamp's integrity is ruined as well.

Many real-life applications of computer technology depend on the long-term storage of data. An example of this is the U.S. Internal Revenue Service's use of computers to store information regarding taxable gifts made over a person's lifetime. For most people living in the United States, gift taxes are not calculated or paid until death, so any information regarding taxable gifts must be maintained over a person's lifetime. In terms of probable advances in computer technology and cryptanalysis, a person's lifetime is like an eternity-it is impractical to assume that the cryptosystems available today will provide any measure of security in 50-70 years. Thus, a need exists for a timestamping mechanism that can adapt to changes in technology to provide a secure timestamp over a long duration of time.

SUMMARY OF THE INVENTION

The present invention provides a method, computer program product, and data processing system for generating and validating an upgradeable digital timestamp of a document. The digital timestamp includes a hash value, a current time, and a digital signature. Over time, as computer and cryptanalytic technology progresses, upgrade timestamps are applied to the document that take advantage of more advanced, more difficult to break hash functions or digital signature schemes. These upgrade timestamps are applied preventatively at a point in time just prior to the timestamp's being able to be compromised.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram depicting a process in a preferred embodiment of the present invention whereby a document is verified to have not been tampered since an initial time stamp was placed on the document; and FIG. 7 is a diagram depicting a process of verifying an updated time stamp where a hash function has been updated, in accordance with a preferred embodiment of the present invention.

DETAILED DESCRIPTION OF THE PREFERRED EMBODIMENT

Figure 1:
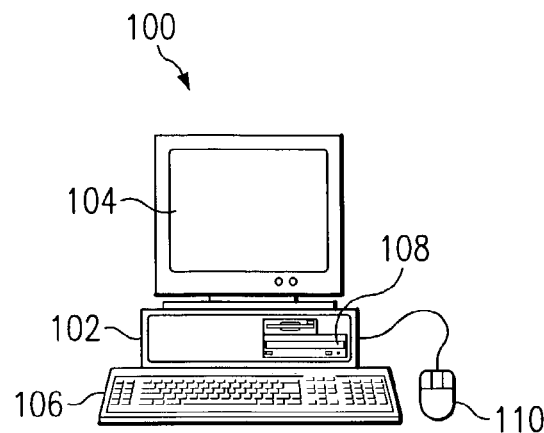
FIG. 1 is an external view of a computer system in which the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM RS/6000 computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
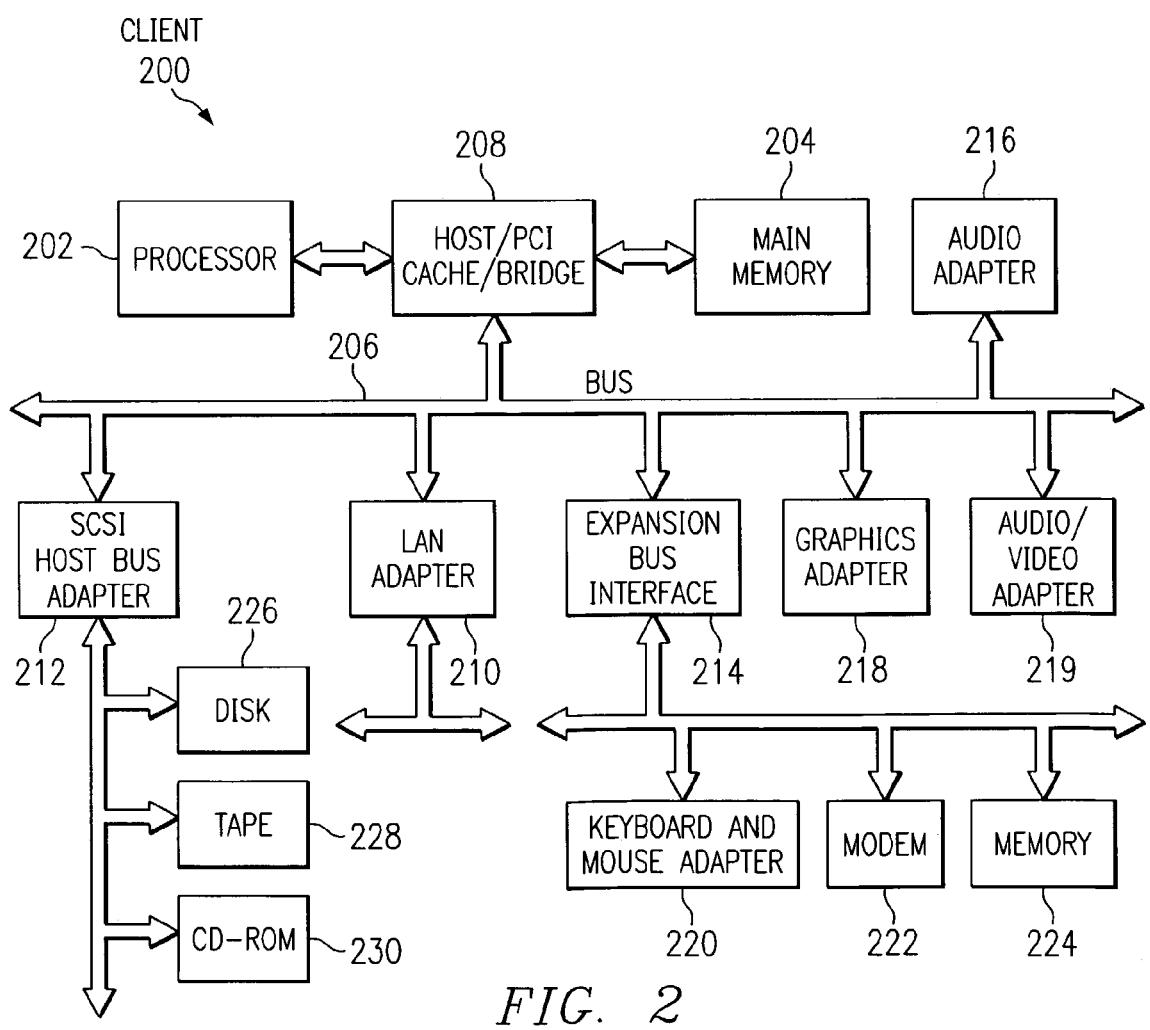
FIG. 2 is a block diagram of a computer system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash ROM (or equivalent nonvolatile memory) or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, must include some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226–230.

Figure 3:
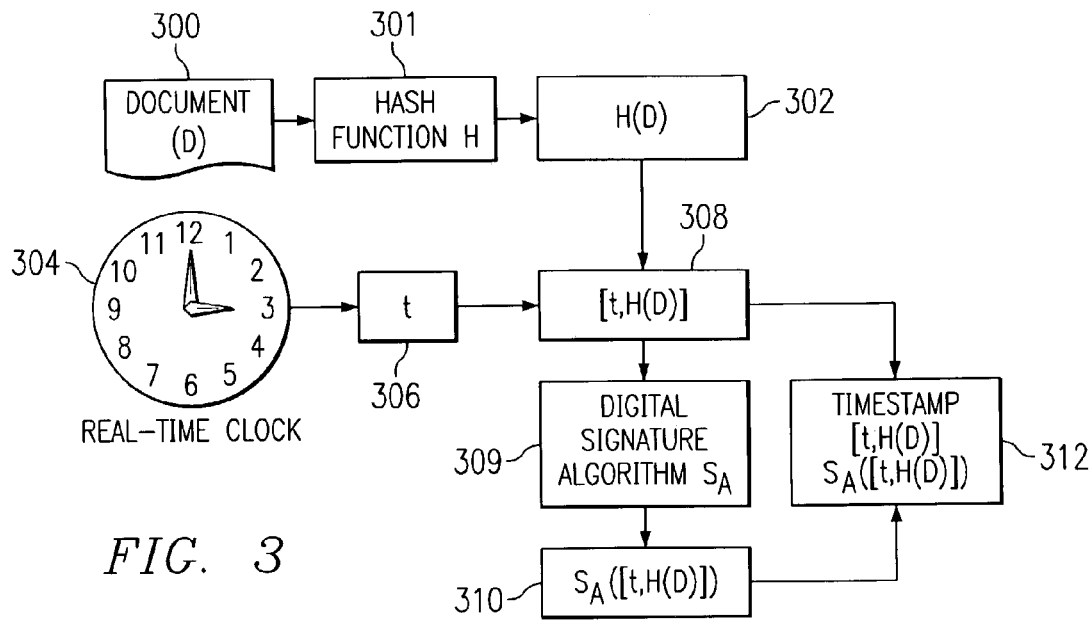
FIG. 3 is a diagram depicting a process of applying an upgradeable time stamp to a document is accordance with a preferred embodiment of the present invention.

FIG. 3 is a diagram depicting a process of applying an upgradeable time stamp to a document is accordance with a preferred embodiment of the present invention. The document (D) 300 is encoded using a hash function 301 to produce hash value 302. A hash function is a function that maps an input of arbitrary finite bit length to an output of fixed bit length. Hash functions are typically used to detect data tampering. Some examples of hash functions existing in the art are the Secure Hash algorithm (SHA), the Message Digest algorithms including MD4 and MD5, the Matyas-Myer-Oseas algorithm, and the like. As the present invention allows the hash function to be updated, many different hash functions may be used without departing from the scope and spirit of the invention.

A real time clock 304 is used to produce a time value t 306. Time value t 306 is combined with hash value 302 to produce an ordered pair 308. (Note that while an ordered pair is depicted, the order in which the elements of the pair appear is immaterial to the operation of the present invention.) A digital signature algorithm 309 is then applied to ordered pair 308 to produce digital signature 310. A digital signature is a sequence of bytes that is dependent on some secret known by the creator of the digital signature and also dependent upon the message being signed. A secret is simply an amount of data that is known only to a select one or more parties. A digital signature serves to authenticate that a document, or other piece of data, was produced by a proper party, since only the proper party will know the correct secret with which to create an authentic signature. Some examples of existing digital signature schemes in the art include the Rivest-Shamir-Adleman digital signature scheme, the Fiat-Shamir signature scheme, and the Digital Signature Algorithm (DSA). As the present invention allows for the upgrading of digital signature algorithms, many different digital signature algorithms may be used in the present invention, including algorithms that have not yet been developed. To complete the time stamp, ordered pair 308 is combined with digital signature 310 to produce time stamp 312.

At this point, it is helpful to consider the significances of the information contained in time stamp 312. Time stamp 312 contains the time t at which the time stamp was created. Time stamp 312 also contains a hash value for document 300 at time t. This hash value can be compared with a computer hash value for document 300 to determine if document 300 has been modified since time t. Finally, time stamp 312 is signed with a digital signature. This means that the time stamp data, the time value t and the hash value, came from an authentic source. In other words, time stamp 312 was not forged.

At some point the underlying cryptographic technology supporting digital signature algorithm 309 may lose its effectiveness. As advances are made in computer technology and encrypt analysis, cryptographic schemes such as digital signature algorithm 309 will become easy to break.

Figure 4:
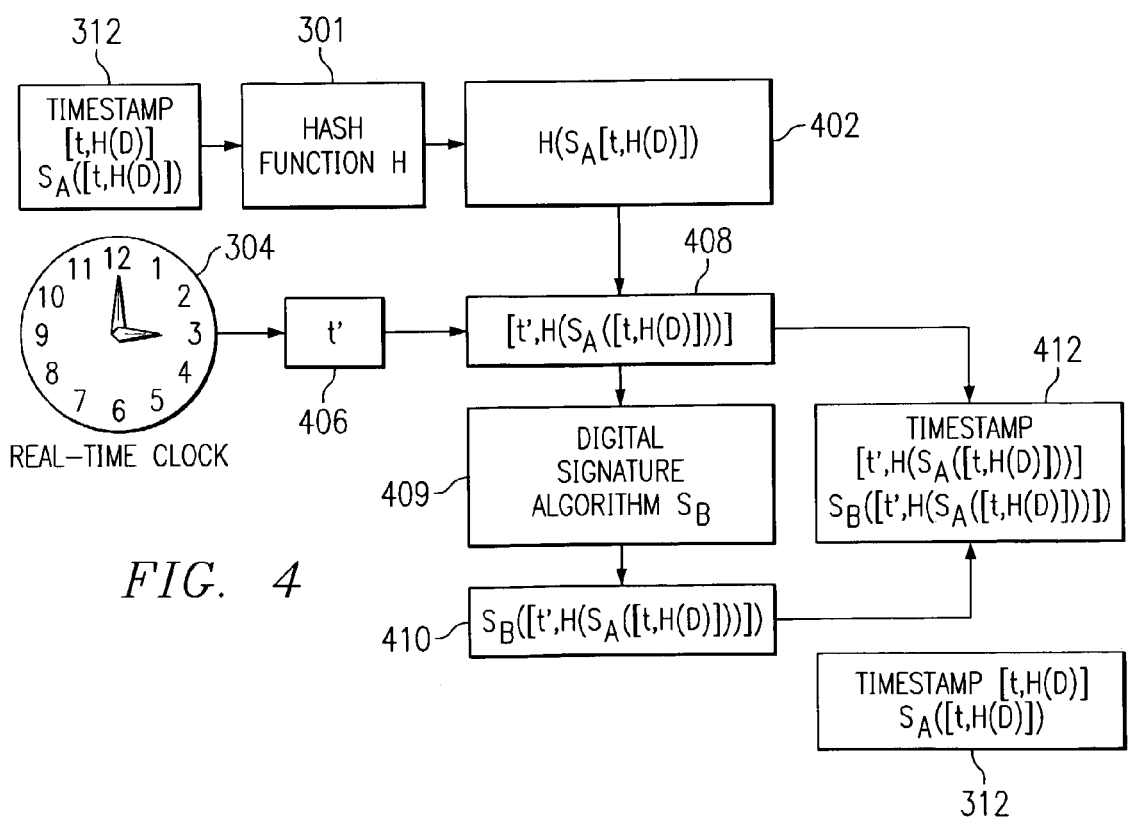
FIG. 4 is a diagram of a process of updating a time stamp to reflect a more powerful digital signature algorithm in accordance with preferred embodiment of the present invention.

FIG. 4 is a diagram of a process of updating a time stamp to reflect a more powerful digital signature algorithm in accordance with preferred embodiment of the present invention. Preferably, the process depicted in FIG. 4 will be applied at some point not long before the digital signature algorithm used in the time stamp becomes susceptible to attack (i.e., is no longer secure). A previously created time stamp 312 is encoded using hash function 301 to produce a new hash value 402. Meanwhile, real time clock 304 is used to produce a new time value t' 406. Hash value 402 and time value t' 406 are combined to produce ordered pair 408. Ordered pair 408 is then processed using an updated digital signature algorithm 409 to produce digital signature 410. Finally, ordered pair 408 and digital signature 410 are combined to produce a new time stamp 412 to be recorded along with existing time stamp 312.

Figure 5:
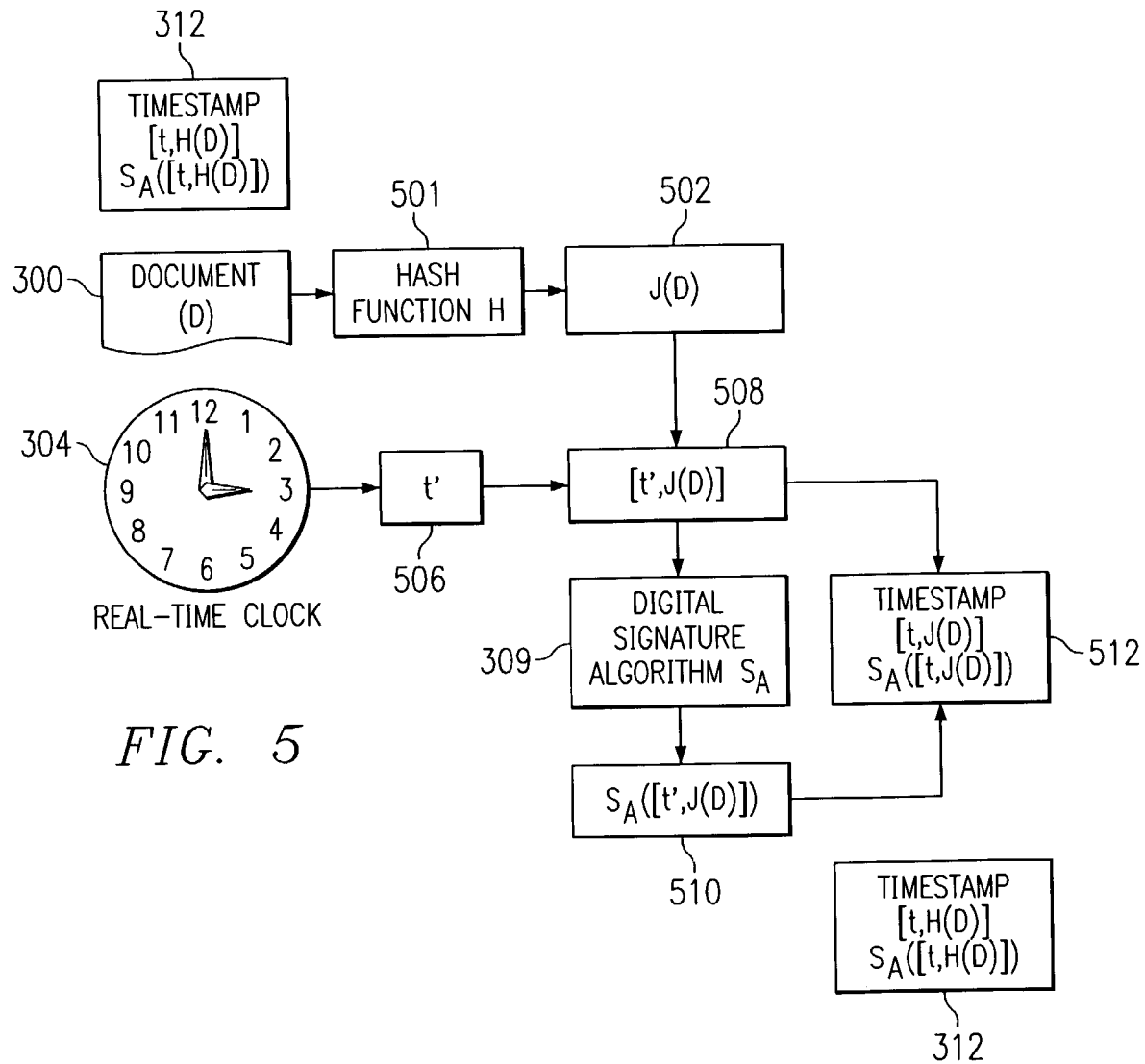
FIG. 5 is a diagram depicting a process of updating a time stamp to reflect a new hash function in accordance with a preferred embodiment of the present invention.

A similar process can be used to update a time stamp in the event that the hash function becomes obsolete. FIG. 5 is a diagram depicting a process of updating a time stamp to reflect a new hash function in accordance with a preferred embodiment of the present invention. As with the process in FIG. 4, the process depicted in FIG. 5 will be applied preferably at some point not long before the hash function used in the time stamp loses its effectiveness. Unlike the situation in FIG. 4, however, the old time stamp 312 is not used to calculate the new time stamp 512. Instead, document 300 is directly encoded using a new hash function 501 to produce hash value 502. Real time clock 304 is used to produce time value t' 506. Hash value 502 and time value t' 506 are combined to produce ordered pair 508, which is then signed using digital signature algorithm 309 to produce digital signature 510. Finally, ordered pair 508 and digital signature 510 are combined to produce a new time stamp 512 to be recorded along with existing timestamp 312.

FIG. 6 is a diagram depicting a process in a preferred embodiment of the present invention whereby a document is verified to have not been tampered since an initial time stamp was placed on the document. FIG. 6 deals with the situation in which the digital signature algorithm was updated. FIG. 7 deals with the alternative situation in which the hash function was updated.

Turning now to FIG. 6, ordered pair 602 of the new time stamp is checked against digital signature 604 from the new time stamp to see if they correspond (stamp 600). If they match, then the new time stamp has not been tampered with (606). Next, digital signature 610 of the original time stamp is checked against hash value 612 contained in ordered pair 602 of the new time stamp. If the computed hash value of digital signature 610 is identical to hash value 612 (step 608), then digital signature 610 has not been modified since the time of the new time stamp (614).

Now ordered pair 618 of the original time stamp is used to verify digital signature 610 from the original time stamp. If they correspond (step 616), then the original time stamp has not been tampered with (620). Finally, the document itself (624) is checked against hash 626 contained in ordered pairs 618 of the original time stamp (step 622). If they match, then the document is good (628). In other words, document 624 has not been modified since the time of the original time stamp.

FIG. 7 is a diagram depicting a process of verifying an updated time stamp where a hash function has been updated, in accordance with a preferred embodiment of the present invention. First, ordered pair 702 and digital signature 704 from the updated time stamp are compared (step 700). If they correspond, then it is known that the document has not been tampered with since the time of the updated time stamp (706). Finally, ordered pair 710 and digital signature 712 from the original time stamp are compared (step 708). If they correspond, then the document has not been tampered with since the time of the original time stamp (714) (since we know that the timestamp was not tampered with between the time of the original and updated time stamps, and we know from validating the second time stamp that the second timestamp has not been tampered with).

It is important to note that while the present invention has been described in the context of a fully functioning data processing system, those of ordinary skill in the art will appreciate that the processes of the present invention are capable of being distributed in the form of a computer readable medium containing instructions or other functional descriptive data in various forms. The present invention is equally applicable, regardless of the particular type of signal bearing media actually used to carry out the distribution. Examples of computer readable media include recordable-type media such a floppy disc, a hard disk drive, a RAM, CD-ROMs, magnetic tape, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of upgrading the integrity of a first timestamp having a first digital signature, the method comprising:
   computing a hash value of the first digital signature;
   combining the hash value with a current time value to form a second data item;
   computing a second digital signature based on the second data item; and
   combining the second data item and the second digital signature to form a second timestamp.

2. The method of claim 1, wherein computing the hash value, combining the hash value with the current time value, computing the second digital signature, and combining the second data item and the second digital signature are performed in response to a determination that the integrity of the first digital signature may soon become able to be compromised.

3. The method of claim 1, further comprising writing the second timestamp to a storage medium.

4. The method of claim 3, further comprising writing the first timestamp to the storage medium.

5. The method of claim 3, wherein the storage medium is memory.

6. The method of claim 3, wherein the storage medium is one of a disk and tape.

7. A method of upgrading the integrity of a first timestamp of a document, wherein the first timestamp includes a first hash value computed with a first hash function, the method comprising:
   calculating a second hash value of the document using a second hash function;
   combining the second hash value with a current time value to form a data item;
   computing a digital signature of the data item; and
   combining the digital signature and the data item to form a second timestamp.

8. The method of claim 7, wherein computing the second hash value, combining the second hash value with the current time value, computing the digital signature, and combining the data item with the digital signature are performed in response to a determination that the integrity of the first hash value may soon become able to be compromised.

9. The method of claim 7, further comprising writing the second timestamp to a storage medium.

10. The method of claim 9, further comprising writing the first timestamp to the storage medium.

11. The method of claim 9, wherein the storage medium is memory.

12. The method of claim 9, wherein the storage medium is one of a disk and tape.

13. A method of verifying the integrity of an upgrade timestamp associated with an earlier timestamp, comprising:
   verifying integrity of a first digital signature associated with the upgrade timestamp;

calculating a first hash value of a second digital signature associated with the earlier timestamp; and verifying that the first hash value matches a second hash value associated with the upgrade timestamp.

14. The method of claim 13, further comprising:

verifying integrity of the earlier timestamp.

15. The method of claim 14, wherein verifying the integrity of the earlier timestamp includes:

verifying integrity of the second digital signature;

calculating a third hash value of a document associated with the earlier timestamp; and verifying that the third hash value matches a fourth hash value associated with the earlier timestamp.

16. A method comprising:

verifying integrity of each of a plurality of digital signatures through the use of a computer, wherein each of the plurality of digital signatures signs a timestamp, and each timestamp includes a hash value of a common document, each hash value having been calculated with a different hash function.

17. A computer program product in a computer readable medium for upgrading the integrity of a first timestamp having a first digital signature, comprising functional descriptive data that, when executed by a computer, enables the computer to perform acts including:

computing a hash value of the first digital signature;

combining the hash value with a current time value to form a second data item;

computing a second digital signature based on the second data item; and combining the second data item and the second digital signature to form a second timestamp.

18. The computer program product of claim 17, wherein computing the hash value, combining the hash value with the current time value, computing the second digital signature, and combining the second data item and the second digital signature are performed in response to a determination that the integrity of the first digital signature may soon become able to be compromised.

19. The computer program product of claim 17, comprising additional functional descriptive data that, when executed by the computer, enables the computer to perform additional acts including:

writing the second timestamp to a storage medium.

20. The computer program product of claim 19, comprising additional functional descriptive data that, when executed by the computer, enables the computer to perform additional acts including:

writing the first timestamp to the storage medium.

21. The computer program product of claim 19, wherein the storage medium is memory.

22. The computer program product of claim 19, wherein the storage medium is one of a disk and tape.

23. A computer program product in a computer readable medium, for upgrading the integrity of a first timestamp of a document, wherein the first timestamp includes a first hash value computed with a first hash function, comprising functional descriptive data that, when executed by a computer, enables the computer to perform acts including:

calculating a second hash value of the document using a second hash function;

combining the second hash value with a current time value to form a data item;

computing a digital signature of the data item; and combining the digital signature and the data item to form a second timestamp.

24. The computer program product of claim 23, wherein computing the second hash value, combining the second hash value with the current time value, computing the digital signature, and combining the data item with the digital signature are performed in response to a determination that the integrity of the first hash value may soon become able to be compromised.

25. The computer program product of claim 23, comprising additional functional descriptive data that, when executed by the computer, enables the computer to perform additional acts including:

writing the second timestamp to a storage medium.

26. The computer program product of claim 25, comprising additional functional descriptive data that, when executed by the computer, enables the computer to perform additional acts including:

writing the first timestamp to the storage medium.

27. The computer program product of claim 25, wherein the storage medium is memory.

28. The computer program product of claim 25, wherein the storage medium is one of a disk and tape.

29. A computer program product in a computer-readable medium, for verifying the integrity of an upgrade timestamp associated with an earlier timestamp, comprising functional descriptive data that, when executed by a computer, enables the computer to perform acts including:

verifying integrity of a first digital signature associated with the upgrade timestamp;

calculating a first hash value of a second digital signature associated with the earlier timestamp; and verifying that the first hash value matches a second hash value associated with the upgrade timestamp.

30. The computer program product of claim 29, comprising additional functional descriptive data that, when executed by the computer, enables the computer to perform additional acts including:

verifying integrity of the earlier timestamp.

31. The computer program product of claim 30, wherein verifying the integrity of the earlier timestamp includes:

verifying integrity of the second digital signature;

calculating a third hash value of a document associated with the earlier timestamp; and verifying that the third hash value matches a fourth hash value associated with the earlier timestamp.

32. A computer program product in a computer-readable medium, comprising functional descriptive data that, when executed by a computer, enables the computer to perform acts including:

verifying integrity of each of a plurality of digital signatures, wherein each of the plurality of digital signatures signs a timestamp, and each timestamp includes a hash value of a common document, each hash value having been calculated with a different hash function.

33. A data processing system for upgrading the integrity of a first timestamp having a first digital signature, comprising means for:

computing a hash value of the first digital signature;

combining the hash value with a current time value to form a second data item;

computing a second digital signature based on the second data item; and combining the second data item and the second digital signature to form a second timestamp.

34. The data processing system of claim 33, wherein computing the hash value, combining the hash value with the current time value, computing the second digital signature, and combining the second data item and the second digital signature are performed in response to a determination that the integrity of the first digital signature may soon become able to be compromised.

35. The data processing system of claim 33, comprising additional means for writing the second timestamp to a storage medium.

36. The data processing system of claim 35, comprising additional means for writing the first timestamp to the storage medium.

37. The data processing system of claim 35, wherein the storage medium is memory.

38. The data processing system of claim 35, wherein the storage medium is one of a disk and tape.

39. A data processing system for upgrading the integrity of a first timestamp of a document, wherein the first timestamp includes a first hash value computed with a first hash function, the data processing system comprising means for:
    calculating a second hash value of the document using a second hash function;
    combining the second hash value with a current time value to form a data item;
    computing a digital signature of the data item; and
    combining the digital signature and the data item to form a second timestamp.

40. The data processing system of claim 39, wherein computing the second hash value, combining the second hash value with the current time value, computing the digital signature, and combining the data item with the digital signature are performed in response to a determination that the integrity of the first hash value may soon become able to be compromised.

41. The data processing system of claim 39, comprising additional means for writing the second timestamp to a storage medium.

42. The data processing system of claim 41, comprising additional means for writing the first timestamp to the storage medium.

43. The data processing system of claim 41, wherein the storage medium is memory.

44. The data processing system of claim 41, wherein the storage medium is one of a disk and tape.

45. A data processing system for verifying the integrity of an upgrade timestamp associated with an earlier timestamp, comprising means for:
    verifying integrity of a first digital signature associated with the upgrade timestamp;
    calculating a first hash value of a second digital signature associated with the earlier timestamp; and
    verifying that the first hash value matches a second hash value associated with the upgrade timestamp.

46. The data processing system of claim 45, comprising additional means for:
    verifying integrity of the earlier timestamp.

47. The data processing system of claim 46, wherein verifying the integrity of the earlier timestamp includes:
    verifying integrity of the second digital signature;
    calculating a third hash value of a document associated with the earlier timestamp; and
    verifying that the third hash value matches a fourth hash value associated with the earlier timestamp.

48. A data processing system configured to:
    verify integrity of each of a plurality of digital signatures, wherein each of the plurality of digital signatures signs a timestamp, and each timestamp includes a hash value of a common document, each hash value having been calculated with a different hash function.

* * * * *